Dec. 23, 1958  J. M. BIDDISON  2,865,484
AUTOMATIC TRANSFER UNIT
Filed Sept. 2, 1953  2 Sheets-Sheet 1

INVENTOR.
JOHN M. BIDDISON
BY Henry G. Dybvig
HIS ATTORNEY

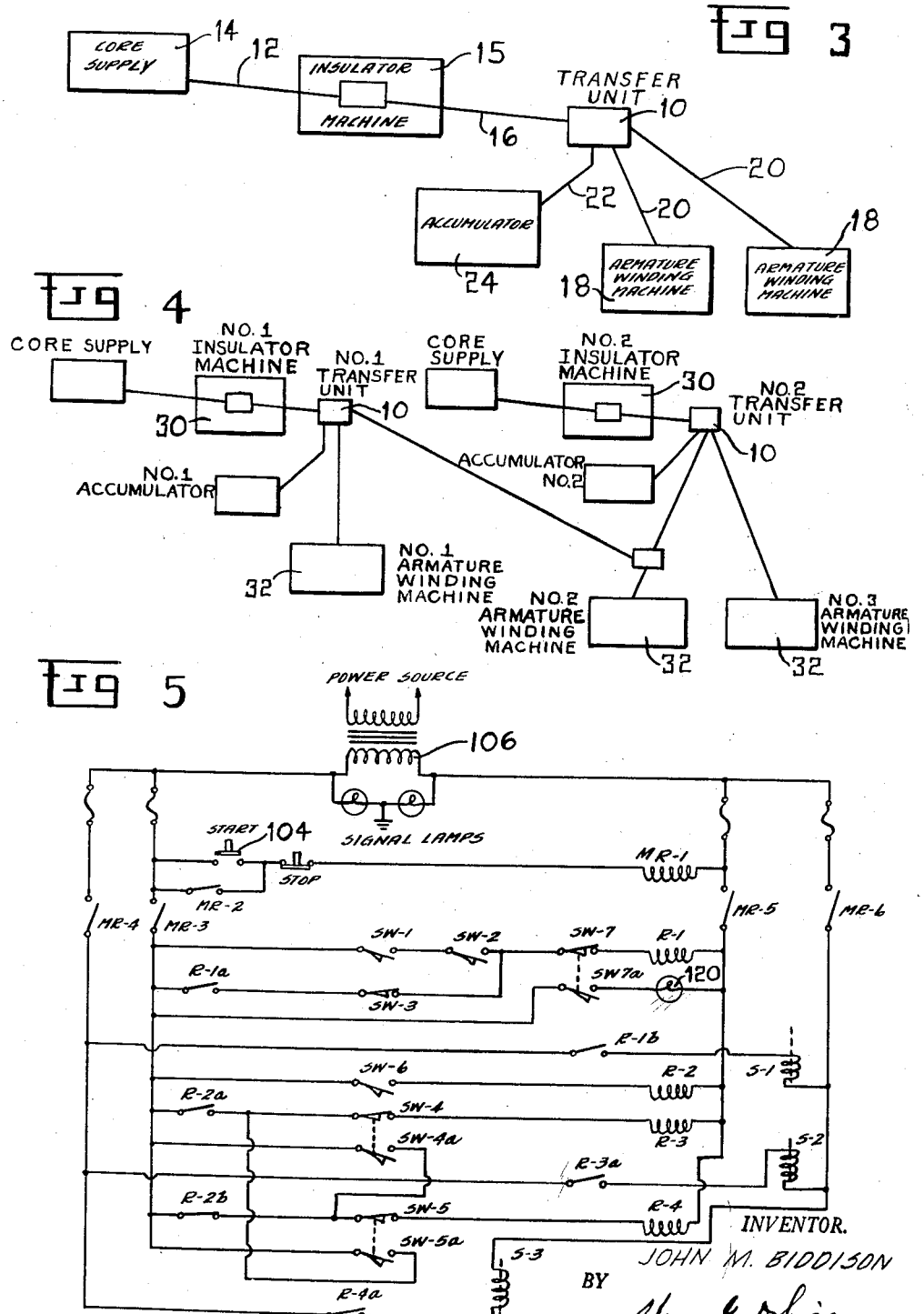

2,865,484

AUTOMATIC TRANSFER UNIT

John M. Biddison, Dayton, Ohio, assignor to Harry W. Moore, Dayton, Ohio

Application September 2, 1953, Serial No. 378,099

5 Claims. (Cl. 193—39)

This invention relates to an automatic transfer unit. It relates particularly to a unit which automatically transfers articles which travel from a source of supply and distributes them in a given ratio to a plurality of distribution conduits.

This invention relates more particularly to a unit for transferring rotors or armatures which are insulated by an insulating machine (such as disclosed in my copending application Serial No. 375,523, filed on or about August 20, 1953), leave the insulating machine and are distributed by the transfer unit to a plurality of distribution conduits, each of which leads to a winding machine (such as disclosed in my copending applications Serial No. 353,160, filed on or about May 5, 1953, now abandoned, and Serial No. 257,711, filed on or about November 23, 1951, now Patent No. 2,670,145). However, the invention is not so limited due to the fact that it may be used for the distribution of any type of article from a source of supply to a plurality of conduits.

It is a well known fact in the art of producing rotors or armatures for electric motors and generators that an insulating machine is capable of insulating more rotors or armatures in a given length of time than can be wound by a winding machine of the same physical size in the same given length of time. Automatic machines have been produced to automatically insulate rotors and armatures. Automatic machines have also been produced for winding electrical conductors upon rotors and armatures. However, a problem has existed in automatically distributing the rotors or armatures, which have been insulated, to the machines which place windings upon the rotors or armatures. It has been learned that two insulating machines of a certain type are capable of insulating rotors at a rate such that three winding machines are required to wind the rotors at the rate at which they are insulated.

Also it has been learned that another type of insulating machine, operating at full capacity, is capable of supplying rotors to two winding machines which work at full capacity.

Hence, an object of this invention is to provide an automatic transfer unit which may be employed to automatically distribute rotors insulated by an insulating machine to winding machines at a rate which will cause the winding machines to work at their full capacities.

Another object of the invention is to provide an automatic transfer unit which will automatically distribute rotors to an accumulator if such conditions exist at the winding machines that the winding machines are unable to operate at their full capacities.

Another object of this invention is to provide a machine which is capable of automatically distributing articles to a set of distribution conduits, in a ratio which is automatically controlled.

Another object of this invention is to provide an automatic transfer unit which will alter its sequence of operations upon a change in conditions in the supply of articles upon any of the conduits to which articles are being distributed.

Other objects and advantages reside in the construction of parts, the combination thereof and the mode of operation, as will become more apparent from the following description.

Referring to the drawings,

Figure 3 is a diagrammatic view disclosing a system in which an automatic transfer unit of this invention is effectively employed.

Figure 4 is a diagrammatic view disclosing another system in which an automatic transfer unit of this invention is effectively employed.

Figure 5 is a schematic wiring diagram disclosing a typical control circuit for control of an automatic transfer unit of this invention.

Figure 1:
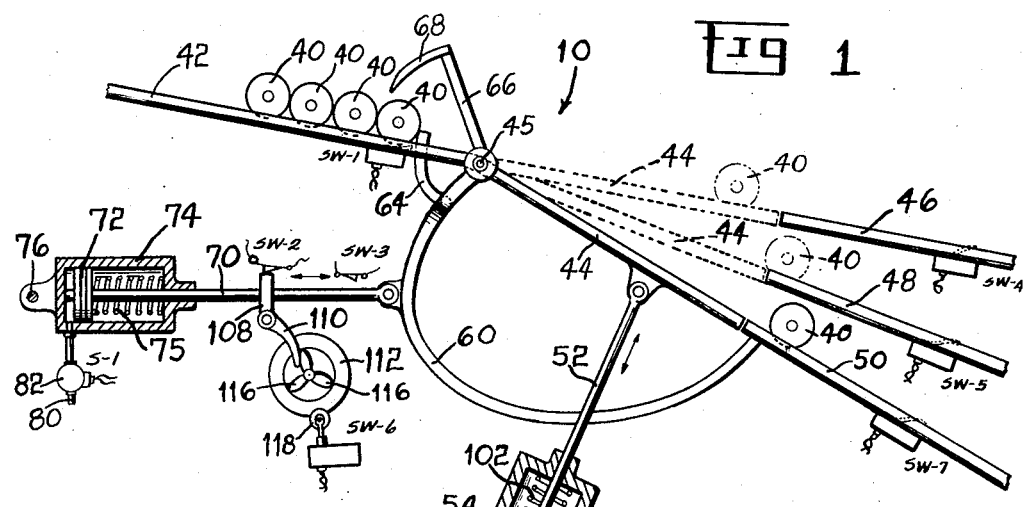
Figure 1 is a side elevational view, partly in section, of an automatic transfer unit of this invention.

Referring to the drawings in detail, Figure 3 discloses diagrammatically the use of a transfer unit 10 which is employed to distribute insulated armature cores which move along a conduit 12 from a core supply 14 to an insulating machine 15. After the slots of the armature cores are insulated, they move upon a conductor 16 to the transfer unit 10 which operates in such a manner, as will be discussed below, that each armature winding machine 18 is supplied with as many insulated armatures upon distribution conduits 20 as the armature winding machine 18 is capable of winding while the insulator machine 15 is functioning. When the capacity of one of the armature winding machines 18 is less than the number of armatures distributed to it on its respective conduit 20, the transfer unit 10 automatically diverts some of the armatures to a conduit 22 which leads to an accumulator 24. Ordinarily, each armature winding machine 18 is capable of winding one-half of the number of armatures which is being insulated by the insulator machine 15. However, if some operating difficulty should occur with either of the armature winding machines 18, the winding machine will function at less than full capacity and consequently some of the armatures must be diverted from that winding machine to the accumulator.

Figure 4 discloses the use of two transfer units 10 in a system in which two insulating machines 30 are employed. Full operating capacity of both insulating machines together is such that they can supply insulated armatures to three armature winding machines 32 when they are operating at full capacity. Transfer unit number 1, therefore, normally distributes insulated armatures from Insulator Machine number 1 to Armature Winding Machines number 1 and number 2 in the ratio of two to one respectively. Likewise, transfer unit number 2 normally distributes insulated armature cores from Insulator Machine number 2 to Armature Winding Machines number 3 and number 2 in the ratio of two to one respectively. If any of the three armature winding machines, for any reason, begins to operate at less than its full capacity, the transfer unit to which it is connected will divert a portion of the armatures to the accumulator to which the transfer unit is connected. After the armature winding machine again begins to operate at full capacity, the transfer unit will automatically divert to it a greater number of armatures.

The automatic transfer unit 10, disclosed in Figure 1, receives armature cores 40 upon a conductor 42, the coil slots of which have been insulated. A transfer conduit 44 is pivotally attached by means of a pin 45 to the end of the conductor 42 and extends from the conductor 42 to the ends of distribution conduits 46, 48, aand 50. The transfer conduit 44 is operable by means of a rod 52 which is pivotally attached to the transfer conduit 44. The rod 52 is operated from a fluid motor comprising a fluid cylinder 54.

A shuttle gate 60 is, also, pivotally attached by means of the pin 45 to the conductor 42. The shuttle gate 60 is arcuately formed so that it may block the passage of an armature 40 from the transfer conduit to any, and all of the distribution conduits 46, 48, and 50 when the transfer conduit 44 is aligned with any one of these three distribution conduits.

Figure 2:
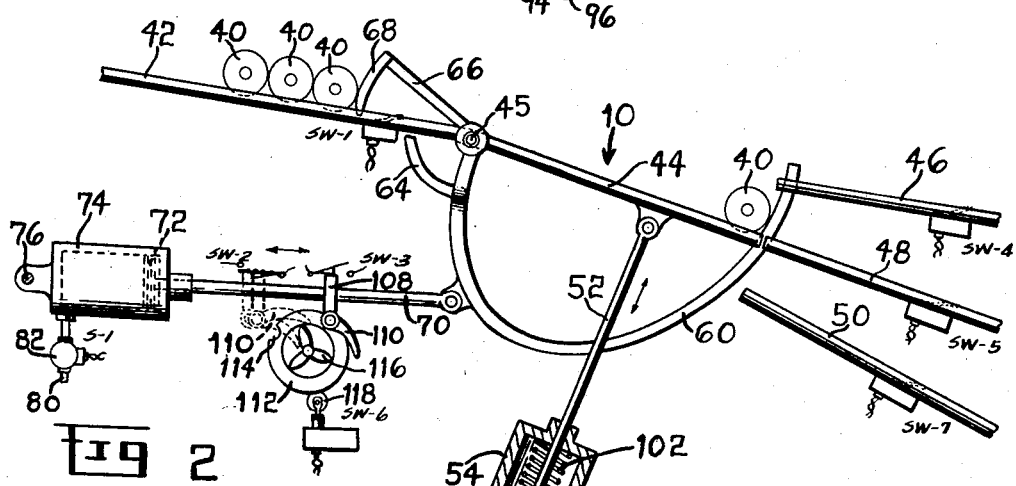
Figure 2 is a side elevational view, partly in section, of an automatic transfer unit of this invention disclosing one step in the operation of the unit.

The shuttle gate 60 is provided with an arcuate escapement arm 64 rigidly attached thereto, adjacent the pin 45. Attached to the shuttle gate 60 and pivotal about the pin 45, is an arm 66 having a finger 68 substantially at a right angle to the arm 66 and integral therewith. The normal position of the arcuate escapement arm 64 of the shuttle gate 60 prohibits movement of armatures 40 to the transfer conduit 44, as disclosed in Figure 1. However, when the shuttle gate 60 is moved upwardly to act as an abutment at the end of the transfer conduit 44, the escapement arm 64 is withdrawn from the path of the armatures 40 which are positioned on the conduit 42, allowing the armatures 40 on the conductor 42 to move toward the transfer conduit 44. As the escapement arm 64 is withdrawn from the path of the armatures 40 upon the conductor 42, the finger 68 of the arm 66 is lowered into a position prohibiting the passage of more than one armature 40 to the transfer conduit 44, as shown in Figure 2. When the shuttle gate 60 is withdrawn, the armature held by the shuttle gate 60 is allowed to move onto the distribution conduit 46, or 48, or 50, depending upon the aligned position of the transfer conduit 44. As the transfer gate 60 is withdrawn, permitting delivery of an armature to one of the distribution conduits 46, 48, or 50, the finger 68 is moved upwardly by the rotative movement of the arm 66, allowing the next armature 40 to move downwardly upon the transfer conduit 44. As the finger 68 is raised, the escapement arm 64 is also raised to act as an abutment in the path of the armature 40 which was allowed to move downwardly upon the conductor 42 by the raising of the finger 68.

The shuttle gate 60 is operated by a rod 70 which is actuated by a piston 72 in a fluid motor comprising a fluid cylinder 74. The piston 72 operates against a helical return spring 75. The fluid cylinder 74 is pivotally supported by a pin 76, so that the cylinder 74 may rotate slightly as the piston 72 forces the rod 70 outwardly moving the shuttle gate 60 upwardly. The spring 75, within the cylinder 74, returns the piston 72 to its normal position when fluid pressure is removed. Fluid of any suitable type is transmitted to the cylinder 74 by means of a tube 80 to which is connected a solenoid operated control valve 82.

The fluid cylinder 54 is used to actuate movement of the transfer conduit 44. The cylinder 54 is provided with two chambers 84 and 86 separated by a wall 87. Within the chamber 84 is a piston 88 provided with a piston rod 90 which slidably protrudes through the wall 87 and into the chamber 86. If it is desired to pivotally move the transfer conduit 44 to alignment with the distribution conduit 48, as shown in Figure 2, fluid pressure is exerted within the chamber 84 upon the lower side of the piston 88 through a tube 94 to which is connected a solenoid operated valve 96. If it is desired to align the transfer conduit 44 with the distribution conduit 46, fluid pressure is exerted through a solenoid operated valve 97 and a tube 98 to a piston 100 within the chamber 86 of the cylinder 54. Pressure of fluid entering the chamber 86 forces the piston 100 to move to the upper end of the chamber 86 and causes the rod 52 to pivotally move the transfer conduit 44 to alignment with the distribution conduit 46. A spring 102 within the chamber 86 returns the pistons 100 and 88 to their normal positions when fluid pressure is removed.

The operation of the transfer unit 10 of this invention is automatically controlled by means of an electrical circuit such as disclosed in Figure 5. When a "Start" button 104 is depressed, the master relay coil MR-1 is energized. Thence a master relay is energized, and the master relay contacts MR-2, MR-3, MR-4, MR-5 and MR-6 are closed. Closing of contact MR-2 "seals in" the circuit to coil MR-1, so that the circuit through MR-1 remains energized when the "Start" button 104 is released. Closing of the contacts MR-3, MR-4, MR-5 and MR-6 provides voltage from a transformer 106 to the entire control system. Limit switches SW-4, SW-5 and SW-7 are attached to distribution conduits 46, 48, and 50 respectively for the purpose of indicating to the control system that a supply of armatures 40 is so excessive upon a distribution conduit that the supply extends from an armature winding machine or from an accumulator back to the limit switch of the respective distribution conduit. Each of the limit switches SW-4, SW-5 and SW-7 has a normally open contact and a normally closed contact, as disclosed in Figure 5. If there is no armature positioned upon one of the limit switches SW-4, SW-5 or SW-7 on its respective distribution conduit, the circuits are energized for normal operation.

Upon the rod 70, operated by the piston 72 in the cylinder 74, is a collar 108 to which is pivotally attached a pawl 110. Rotatably supported adjacent the rod 70 is a selector cam 112 having a notch 114. The selector cam 112 is provided with three leaves 116, one of which is engaged by the pawl 110 upon each actuation of the rod 70. A stop (not shown) is provided in the pivotal attachment of the pawl 110 to the collar 108, so that the pawl 110 can easily rotate counterclockwise, but cannot rotate clockwise further than the position shown in Figure 1.

The selector cam 112 operates a selector switch SW-6 provided with an engaging roller 118. The notch 114 acts as a recess for the roller 118, so that the selector switch SW-6 is open when the roller 118 is recessed in the notch 114. It will be understood, therefore, that as reciprocal movement of the rod 70 occurs, the selector cam 112 is rotated one-third of a revolution upon each actuation of the rod 70. Hence, every third actuation of the rod 70 places the notch 114 in position to be used as a recess by the roller 118, and the next stroke rotates the cam 112, as shown in Figure 2, so that the roller 118 is not in the recess 114, and due to the fact that the roller 118 is not in the recess 114, the selector switch SW-6 is closed. The next actuation of the rod 70 causes the pawl to rotate the selector cam 112 another one-third revolution and in this position of the cam 112 the selector switch SW-6 remains closed. However, upon the next actuation of the rod 70 the pawl 110 rotates the selector cam 112 to the position as shown in Figure 1, so that the roller 118 is permitted to rest in the notch 114 and the selector switch SW-6 is open.

When the selector switch SW-6 is closed, the relay coil R-2 is energized, closing contact R-2a and opening contact R-2b. Hence, a circuit is completed through contact R-2a, through contact SW-4, and through relay coil R-3, closing relay contact R-3a and energizing solenoid coil S-2 of the solenoid operated valve 97. The transfer conduit 44 is thereby moved by piston 100 to alignment with the distribution conduit 46.

When an armature 40 is positioned on the conductor 42 over a switch SW-1, as shown in Figure 1, the switch contact SW-1 shown in Figure 5 is closed. The switch SW-2 is closed by means of the collar 108. The collar 108, moving with the rod 70, alternately operates switches SW-2 and SW-3 which are located adjacent the rod 70. Therefore, when the switches SW-2 and SW-1 are closed and the contacts MR-3, MR-4, MR-5 and MR-6 are closed, the relay coil R-1 is energized. Coil R-1 causes the relay contacts R–1a and R–1b to close. Closing of contact R–1b energizes solenoid coil S–1 which opens the valve 82, permitting hydraulic fluid to pass into the cylinder 74, forcing the piston 72 to move the rod 70 which rotatively moves the shuttle gate 60. Movement of the shuttle gate 60, as above described, allows the armature 40, which is abutting the escapement arm 64, to move onto the transfer conduit 44. Due to the fact that the automatic control, disclosed in Figure 5, has moved the transfer conduit to alignment with distribution conduit 46, the armature 40 will move onto the distribution conduit 46 when the shuttle gate 60 is retracted. Retraction of the shuttle gate 60 is automatically actuated by the opening of the switch SW–3 by means of movement of the collar 108 as the rod 70 moves the shuttle gate 60 upwardly as shown in Figure 2. Relay coil R–1 is thereby de-energized, opening contact R–1a and de-energizing solenoid coil S–1, removing fluid pressure from the piston 72, allowing the spring 75 to return the piston 72 to its normal position, as shown in Figure 1. When the piston 72 returns to its normal position, the next approaching armature 40 is permitted to pass downwardly upon the conductor 42 to abut the escapement arm 64. When this occurs, the switch SW–1 is closed by the next approaching armature 40 and operation of the shuttle gate 60 is repeated. Due to the fact that the selector cam 112 is constructed in the manner above described, the transfer conduit 44 will be aligned with the distribution conduit 46 two out of every three actuations of the shuttle gate 60. The distribution conduit 46 will therefore receive two out of every three armatures distributed by the transfer conduit 44, and the distribution conduit 48 will receive one out of every three armatures distributed by the transfer conduit 44 during normal distribution.

However, if trouble should occur in the armature winding machine which receives armatures upon the distribution conduit 46, and the line of armatures upon the distribution conduit 46 becomes so great that an armature rests upon limit switch SW–4, the distribution of armatures by the transfer conduit automatically changes. The normally closed contact SW–4 is opened, so that the relay coil R–3 cannot be energized and the contact R–3a remains open and the solenoid coil S–2 of the valve 97 remains open. Then the solenoid coil S–3 of the valve 96 is energized and the transfer conduit 44 remains aligned with the distribution conduit 48 regardless of the operation of the switch SW–6.

When the supply of armatures upon the conduit 48 also becomes too great, in addition to the excessive supply of armatures upon distribution conduit 46, and an armature is positioned upon the switch SW–5, in addition to the armature upon the switch SW–4, the transfer conduit 44 is automatically held in the position aligning it with distribution conduit 50 which leads to an accumulator. This aligning of the transfer conduit 44 with the distribution conduit 50 is a result of the opening of the normally closed contact SW–5 and the opening of the normally closed contact SW–4, so that the circuits to solenoid coils S–2 and S–3 of valves 97 and 96, respectively, are de-energized.

If the supply of armatures to the accumulator supplied upon distribution conduit 50 should become excessive in addition to the excess of armatures upon the distribution conduits 46 and 48, the normally closed contact SW–7 opens and the normally open contact SW–7a closes. Opening contact SW–7 keeps coil R–1 de-energized, so that the solenoid coil S–1 of valve 82 is de-energized, causing piston 72 and rod 70 to be de-energized. Closing the contact SW–7a energizes a light or signal 120, indicating that the situation upon the conduits 46, 48 and 50 has automatically caused the transfer unit 10 to temporarily cease operation. When the supply of armatures upon any of the distribution conduits 46, 48 or 50 decreases, allowing its respective limit switch to close, the control circuit automatically initiates operation of transfer conduit 44 and the transfer conduit 44 is caused to be aligned with that distribution conduit and the shuttle gate automatically functions to furnish armatures to that distribution conduit. Whenever the limit switches SW–4 and SW–5 are both opened by the decrease in the supply of armatures on their distribution conduits 46 and 48, the operation of a two to one armature distribution by the transfer conduit 44 and the shuttle gate 60 automatically resumes.

Therefore, it may be understood that the transfer unit of this invention provides complete automatic distribution while also providing complete automatic protection against an overflow of insulated armatures. Each winding machine is automatically supplied with as many insulated armatures as it is capable of winding.

This invention may be used in association with any number of distribution conduits and with any type of distribution ratio desired for any particular application. By use of different combinations or different types of notched cams or various types of multiple compartment piston cylinders, or different combinations of control relays, a variety of types of distribution ratios and modes of operation are available.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a transfer device for distributing articles movable on a receiving conductor to a set of distribution conduits, a transfer conduit pivotally movable adjacent the receiving conductor, a pivotally operable gate member attached to the receiving conductor, an escapement arm attached to the gate member, a control finger also attached to the gate member disposed in angular spaced relation from the escapement arm and cooperably operable with the escapement arm to allow movement of one article to the transfer conduit upon each operation of the gate member, a multiple position reciprocally operable fluid motor attached to the transfer conduit operable to align the transfer conduit with any one of the distribution conduits, fluid operable piston means attached to the gate member for movement thereof, switch means adjacent the receiving conductor and the distribution conduits indicating positions of articles thereupon, solenoid operable valve means controlling flow of fluid to and from the fluid motor and the piston means, and control means attached to the solenoid operable valve means.

2. A transfer unit for distributing articles movable upon a conductor from a source of supply to a set of distribution conduits, transfer means movable between the conductor and the set of distribution conduits, gate means movable between the conductor and the set of distribution conduits for controlling movement of articles from the transfer means, an escapement arm attached to the gate means and movable therewith, the escapement arm being adjacent the conductor for controlling movement of articles from the conductor to the transfer means, an abutment finger attached to the gate means and movable therewith adjacent the conductor, the abutment finger being in spaced relation from the escapement arm for permitting one of said articles therebetween, and means actuating movement of the transfer means and the gate means controlled by the position of articles upon the distribution conduits and upon the conductor.

3. In a machine for distributing articles from a supply thereof, the combination comprising a supply conduit, a plurality of distribution conduits in spaced relation from the supply conduit, an escapement arm pivotally attached to the supply conduit and movable to engage an article disposed upon the supply conduit to prevent movement of the article from the supply conduit, an abutment finger member pivotally attached to the supply conduit and movable with the escapement arm, the finger member being disposed in angular spaced relation from the escapement arm, the finger member being engageable with an article disposed upon the supply conduit to prevent movement of the article from the supply conduit when the escapement arm is pivotally moved to such an angular position that it cannot engage an article disposed upon the supply conduit, a transfer conduit pivotally attached to the supply conduit at the end thereof, the transfer conduit having an end movable to axially aligned juxtaposition with any one of the distribution conduits, a shuttle gate pivotally attached to the supply conduit and pivotally movable with the escapement arm and the finger member, the shuttle gate being movable adjacent the transfer conduit to engage an article thereupon to prevent movement of the article from the transfer conduit, the shuttle gate being angularly disposed with respect to the escapement arm so that when the escapement arm is out of position for engagement with an article upon the supply conduit the shuttle gate is positioned so as to engage an article upon the transfer conduit.

4. In a machine for distributing articles from a supply thereof, the combination comprising a supply conduit, a plurality of distribution conduits in spaced relation from the supply conduit, an escapement arm pivotally attached to the supply conduit and movable to engage an article disposed upon the supply conduit to prevent movement of the article from the supply conduit, an abutment finger member pivotally attached to the supply conduit and movable with the escapement arm, the abutment finger member being disposed in angular spaced relation from the escapement arm, the distance between the finger member and the escapement arm being slightly greater than the dimension of an article along the supply conduit, the finger member being engageable with an article disposed upon the supply conduit when the escapement arm is pivotally moved to such an angular position that it cannot engage an article disposed upon the supply conduit, a transfer conduit pivotally attached to the supply conduit at the end thereof, the transfer conduit having an end movable adjacent each of the distribution conduits, a shuttle gate pivotally attached to the supply conduit and pivotally movable with the escapement arm and the finger member, the shuttle gate being movable adjacent the transfer conduit to engage an article thereupon to prevent movement therefrom, the shuttle gate being angularly disposed with respect to the escapement arm so that when the escapement arm is out of position for engagement with an article upon the supply conduit the shuttle gate is positioned so as to engage an article upon the transfer conduit, means attached to the transfer conduit for movement of said end thereof to any one of the distribution conduits, and means attached to the shuttle gate for movement thereof with movement of the finger member and the escapement arm.

5. In an automatic transfer unit for use with an automatically operable insulating machine, a plurality of rotor winding machines, and an accumulator, the combination comprising conductor means for connecting the transfer unit to the insulating machine, a plurality of distribution conduits, there being a distribution conduit for connecting the transfer unit to each of the rotor winding machines, there also being a distribution conduit for connecting the transfer unit to the accumulator, the transfer unit including a transfer conduit pivotally operable between the conductor means and the distribution conduits, the transfer conduit having an end movable to juxtaposed alignment with any one of the distribution conduits, the transfer unit also including gate means pivotally attached to the conductor means, angularly spaced apart members attached to the conductor means for preventing movement of rotors disposed on the conductor means, the angularly spaced apart members permitting movement of only one rotor from the conductor means upon each operation of the gate means, said gate means also including a member movable adjacent the transfer conduit and engageable with a rotor upon the transfer conduit for controlling movement of a rotor from the transfer conduit to one of the distribution conduits, and control means for governing the ratio of distribution of rotors to the distribution conduits.

References Cited in the file of this patent

UNITED STATES PATENTS

| | | |
|---|---|---|
| 676,761 | Morris | June 18, 1901 |
| 1,187,861 | Rembold | June 20, 1916 |
| 1,561,341 | Martin | Nov. 10, 1925 |
| 1,749,843 | Roark | Mar. 11, 1930 |
| 1,806,879 | Lindgren | May 26, 1931 |
| 2,292,821 | Caulkins | Aug. 11, 1942 |
| 2,396,787 | Hawthorne et al. | Mar. 19, 1946 |
| 2,559,369 | Phillips | July 3, 1951 |
| 2,570,923 | Dodge | Oct. 9, 1951 |
| 2,607,460 | Russell | Aug. 19, 1952 |
| 2,648,312 | Tucker et al. | Aug. 11, 1953 |